United States Patent [19]

Hughes

[11] Patent Number: 5,312,807
[45] Date of Patent: May 17, 1994

[54] METHOD OF IMPROVING ABSORPTION OF SALT WATER BY WATER-SWELLABLE CLAY BY REDRYING

[75] Inventor: John Hughes, Long Grove, Ill.

[73] Assignee: American Colloid Company, Arlington Heights, Ill.

[21] Appl. No.: 985,830

[22] Filed: Dec. 3, 1992

Related U.S. Application Data

[60] Continuation-in-part of Ser. No. 729,931, Jul. 15, 1991, abandoned, which is a division of Ser. No. 608,816, Nov. 5, 1990, Pat. No. 5,114,893.

[51] Int. Cl.$^5$ ............................................. C09K 7/00
[52] U.S. Cl. .................................. 507/100; 501/149; 252/313.1; 252/315.5
[58] Field of Search .................. 501/149; 507/100; 252/315.5, 313.1

[56] References Cited

U.S. PATENT DOCUMENTS

| | | | |
|---|---|---|---|
| 1,569,251 | 1/1926 | Austin | 501/149 |
| 2,672,442 | 3/1954 | Clem | 507/100 |
| 2,950,983 | 8/1960 | Rowland | 501/149 X |
| 3,150,835 | 9/1964 | Horton | 501/100 X |
| 4,422,855 | 12/1983 | Sawyer, Jr. | 507/100 X |

OTHER PUBLICATIONS

Thorson, T A 34th Annu Wyoming Geol Ass Geol of the Bighorn Basin Field Conf (Billings, Mt., 83.09.17-21) pp. 167-170, 1983.
Gray et al, Composition and Properties of Oil Well Drilling Muds (Houston, Gulf Publishing Co., 1980) p. 540 TN 871.2 G695.
Grim, R. E. Applied Clay Mineralogy (New York, McGraw-Hill, 1962) pp. 204-229 TA 455 C55G7.

*Primary Examiner*—Gary Geist
*Attorney, Agent, or Firm*—Marhsall, O'Toole, Gerstein, Murray & Borun

[57] ABSTRACT

A method of treating a water-swellable clay after the clay has been mined and dried to improve its properties when in contact with salt-contaminated water. After the common initial drying of the clay to a moisture content of 12% by weight or less, the clay is rewetted to a moisture content of more than 12% by weight, preferably at least about 15% or more, based on the dry weight of the clay, then redried to a moisture content of 12% by weight or less, based on the dry weight of the clay. This rewetting and redrying processing of a dried clay unexpectedly improves the salt water absorbency, and viscosity properties when the clay is in contact with salt-contaminated water; unexpectedly increases the rheology properties of the clays for oil well drilling fluids and lost circulation fields when salt-contaminated water is encountered during drilling, as a suspending agent in the cosmetics and pharmaceutical industries when the composition contains a dissolved salt; and provides unexpectedly increased salt water-absorption in forming water-swellable clay-based water barriers.

15 Claims, 9 Drawing Sheets

METHOD OF IMPROVING ABSORPTION OF SALT WATER BY WATER-SWELLABLE CLAY BY REDRYING

CROSS-REFERENCE TO RELATED APPLICATIONS

This application is a continuation-in-part of Applicant's copending application Ser. No. 07/729,931 filed Jul. 15, 1992, now abandoned which is a divisional of application Ser. No. 07/608,816 filed Nov. 15, 1990, now U.S. Pat. No. 5,114,893.

FIELD OF THE INVENTION

The present invention is directed to a method of improving the salt-containing water absorption ability of water-swellable clays, particularly non-blue water-swellable clays, such as bentonite, that initially have acceptable colloidal properties, e.g., have a $Fe^{+3}/Fe^{+2}$ ratio above 1.0, and preferably above 3.0, including the steps of drying the mined clay, rewetting the clay, and redrying the clay to improve its salt-contaminated water-absorption ability. The processed, rewetted and redried, water-swellable clay is unexpectedly better for use as a salt-contaminated water-absorbent for the formation of ponds, lagoons and hazardous waste containment areas; for use in oil well drilling fluids wherein salt-contaminated water is encountered during drilling; for use in lost circulation fluids where salt-contaminated water is encountered in drilling; for use as a salt water-absorbing material to form a salt-contaminated water barrier in panels, and in flexible, multi-layer articles; for use in salt water-absorbent articles, such as diapers, tampons and the like; and for any other purpose and in any environment wherein a water-swellable clay is used for its water-absorption properties for absorption of salt-contaminated water.

BACKGROUND OF THE INVENTION AND PRIOR ART

Water-swellable clays that have acceptable water-swellability and colloidal properties, e.g., the non-blue bentonites having a $Fe^{+3}/Fe^{+2}$ ratio above 1.0, and preferably above 3.0, have a great number of industrial uses that rely upon the ability of the clay to absorb many times its weight in water. Such water-swellable clays, such as sodium bentonite, however, lose much of their absorbency if the water absorbed is contaminated with water-soluble metal salts of alkali metals or alkaline earth metals, particularly the sulfate or halide salts, such as sodium chloride, magnesium chloride, calcium bromide, calcium chloride, potassium chloride, salt-containing body fluids and the like. Some bentonite clays, such as the blue bentonites disclosed in Clem U.S. Pat. No. 2,672,442, require the uptake of calcium ions to provide acceptable water swellability and colloidal properties for industrial acceptance. The preferred water-swellable clays useful as starting materials in accordance with the present invention are non-blue bentonites (green to greenish yellow to yellow to cream colored) that have industrially acceptable water swellability and colloidal properties and have a $Fe^{+3}/Fe^{+2}$ ratio greater than 1.0, preferably at least 3.0, and most preferably in the range of about 5.0 to about 15.0. Some of these industrial uses for the treated water-swellable clays of the present invention, where once dried water-swellable clays, e.g., sodium bentonite, have their absorbency adversely affected upon contact with salt-contaminated water, are described as follows.

1. Drilling Muds

In drilling wells by rotary methods it is a common practice to circulate, continuously, a drilling mud or fluid into and out of a borehole during the drilling operation. The drilling mud is pumped into a drill pipe from a mud pit and the mud passes down to the bottom of the borehole. The drilling mud then flows upwardly through an annular space between the borehole wall and the drill pipe, and finally flows from the borehole through a mud ditch back to the mud pit, wherein the mud is mechanically or chemically treated before recirculation through the borehole.

The drilling mud serves several purposes that influence such factors as the drilling rate, cost, efficiency and safety of the operation. The drilling mud lubricates and cools the drill bit, acts as a vehicle to carry the cuttings from the borehole, and provides sufficient equalizing hydrostatic pressure against the formation wall to prevent the borehole wall from cave-in during drilling. By using proper mud formulations, the borehole entry of gases and fluids encountered in the surrounding earthen formations pierced by the drill is inhibited and possible collapse or blowouts resulting from uncontrolled influxes of these formation fluids may be prevented. The drilling mud also exerts a "wall-building" effect whereby it often forms a thin filter cake on a borehole wall, thus sealing off the borehole and reducing water loss to the penetrated formations.

An acceptable mud must have body yet be free-flowing with relatively low viscosity in order to facilitate pumping. The mud must also have an acceptable gel strength in order to suspend solid material if circulation is interrupted and to prevent accumulation of solids at the drill bit to avoid mechanical jamming. Acceptable drilling muds may be either oil-based or water-based, and they are normally treated to provide the rheological properties that make them particularly desirable and useful for drilling wells. For example, drilling muds may be treated with barium sulfate (barite) or lead sulfide (galena) to increase their density.

The efficiency of the drilling process is related to the velocity of the mud flowing up the annular space between the borehole wall and drill pipe. This velocity is in turn related to the viscosity, density and flow properties of the mud. In addition, the drilling mud viscosity is known to depend upon the quality, concentration and state of dispersion of the colloidal solids of the mud. As the drilling operation proceeds, the rheological properties of the mud may be adversely affected by such factors as the nature of the drilled strata, loss or gain of water to the mud, chemically-active contaminants that may flocculate the mud, mud pH, and most importantly, the increasing temperatures and pressures encountered at deeper drilling depths. In order to maintain workable viscosities, the muds must be formulated to respond to varying circumstances and conditions encountered during use. Since improvements in efficiency are realized as the viscosity and density of a mud are increased, it is desirable to optimize drilling mud formulations to possess the highest viscosity and density workably feasible for a given formation at a given depth.

Whenever possible, usually for reasons of economy, water-based drilling muds are used throughout the drilling operation. The suspending solids in water-based drilling muds are typically clays from the kaolinite, montmorillonite or ilite groups. These clays impart desirable thixotropic properties to the drilling mud and also coat the walls of the well with a relatively impermeable sheath, commonly called a "filter cake", that retards fluid loss from the well into the formations penetrated by the well. These properties of the suspended, water-swellable clays are substantially adversely affected by contact of the clay with salt-contaminated water resulting in less clay swelling and concomitant lower viscosity and more fluid loss.

An exemplary montmorillonite clay that can be used in a water-base drilling mud is a non-blue bentonite. The bentonite is dispersed within the water-based liquid as colloidal particles and imparts various degrees of thixotropy to the drilling mud. Non-blue, e.g., sodium bentonite, water-swellable clays that are rewetted and redried, in accordance with the present invention, are initially non-blue clays, e.g., are initially industrially acceptable for this purpose, having good water swellability and colloidal properties and having a sufficient ratio of $Fe^{+3}/Fe^{+2}$, at least above 1.0, preferably at least 3.0 and most preferably in the range of about 5.0 to about 15.0, and, after processing, have excellent rheological properties for use in preparing aqueous drilling muds despite contact with salt-contaminated water during the drilling process.

2. Lost Circulation Fluid

One difficultly often encountered in rotary drilling operations involves the loss of unacceptably large amounts of the drilling mud into a porous or cracked formation penetrated by the drill. The loss of drilling mud is termed "lost circulation", and the formation is termed a "lost circulation zone" or a "thief formation".

Lost circulation occurs when the well encounters a formation either having unusually high permeability or having naturally occurring fractures, fissures, porous sand formations, cracked or cavernous formations or other types of strata characterized by crevices, channels or similar types of openings conducive to drilling fluid loss. In addition, it is also possible for a formation to be fractured by the hydrostatic pressure of the drilling mud, particularly when a changeover is made to a relatively heavy mud in order to control high internal formation pressures.

When lost circulation occurs, the drilling mud pumped into the well through a drill string enters the cracks in a cracked formation or the interstices of a porous formation and escapes from the wellbore, therefore precluding return of the drilling mud to the surface. In the most severe situation, the lost circulation zone takes the drilling mud as fast as it is pumped into the wellbore, and, in the less severe situations, circulation of the drilling mud can be greatly reduced, and eventually result in a shutdown of drilling operations. Normally, the maximum amount of drilling mud loss that is tolerated before changing programs is approximately one barrel per hour. If a greater amount of drilling mud is lost, corrective measures are needed. Drilling generally is not resumed until the thief formation is closed off and circulation of the drilling mud reestablished.

The interruption of normal circulation prevents the removal, by entrainment, of cuttings and other materials from the borehole, leads to reduced hydrostatic pressure possibly followed by the influx into the wellbore of high pressure formation fluids, can result in the flooding of oil-producing zones with mud or the like, and may eventually cause the drill string to become stuck in the borehole. Even in situations where circulation is not completely lost and some drilling mud can return to the surface, the drilling mud flowing into the lost circulation zone must be replaced continuously. If the drilling mud loss is sufficiently high, the cost of continued drilling or well operation may become prohibitive. Therefore, the lost circulation of drilling mud is a condition that must be prevented or be corrected as quickly as possible.

The best method of controlling lost circulation is to conduct a drilling program such that mud loss will not occur. However, situations exist wherein even correct drilling techniques cannot avoid lost circulation. Therefore, many methods have been used in attempts to plug the cracks or interstices of lost circulation zones to prevent the escape of drilling muds. As a result, a wide variety of materials have been pumped into the well with the drilling mud in an effort to bridge or fill the cracks or interstices of thief formations. It has been found that some materials are successful under certain drilling conditions, yet the same material is unsuccessful under other drilling conditions.

One common method is to increase the viscosity of the drilling mud or to increase the resistance of the drilling mud to flow into the formation. Another technique involves the addition of a bulk material, such as cottonseed hulls, cork, sawdust, perlite, ground walnut shells, hay, wood shavings, granular plastic, vermiculite, rock, mica flakes, leather strips, beans, peas, rice, sponges, feathers, manure, fish scales, corn cobs, glass fiber, asphalt, ground tires, burlap or other fabrics to the drilling mud. By adding these fibrous, flaky or granular solids to the drilling mud and pumping the resulting mixture into the borehole, a bridge or mat forms over the cracks or interstices responsible for drilling mud escape.

Although lost circulation zones frequently are plugged by such bulk materials, successful plugging of the thief formation is not assured. Even if large volumes of a solids-containing drilling mud are pumped into the borehole, a bridge or mat may never form over the cracks or interstices of the thief formation. Moreover, the introduction of large quantities of a drilling mud containing a relatively high percentage of bulky solids can produce pressure surges that cause further fracturing and therefore result in additional fissures for even greater drilling mud losses. Bulk materials also have proven unsuccessful in sealing off porous formations because they have a tendency to deteriorate under the high drilling pressures, and therefore decrease in volume and become slimy so as to "worm" into the formation openings without forming an effective seal.

The water-swellable clays processed in accordance with the present invention are processed by starting with an industrially acceptable, e.g., non-blue, bentonite clay, that is initially industrially acceptable for this purpose, having good water swellability and colloidal properties and having a sufficient ratio of $Fe^{+3}/Fe^{+2}$ above 1.0, preferably at least 3.0 and most preferably in the range of about 5.0 to about 15.0. The non-blue bentonite clay is rewetted and redried, as described in more detail hereinafter and, after processing, unexpectedly has the ability to continue to increase the viscosity of aqueous liquids, with time, so that the clay will continue to swell upon entering the interstices of a thief formation for effective plugging despite contact with salt-contaminated water during the drilling process.

3. Water Absorbency and Swellability

The water-swellable clays rewetted and redried in accordance with the principals of the present invention are capable of new and unexpected water-absorbency and swellability when contacted with salt-contaminated water making them very useful for a number of industrial products and processes. The water-swellable clays rewetted and redried in accordance with the principles of the present invention provide unexpected water absorbency of salt-contaminated water and swellability upon contact with salt-contaminated water making the clays very suitable for use in moisture impervious rigid and flexible panels; for preventing water contaminated with industrial waste, including metal salts, from seeping through soil containing one or more of the treated water-swellable clays; for water-proofing compositions in non-viscous sprayable forms, or paste or putty-like forms, capable of being applied by spray methods, caulking gun, or trowel; for use together with one or more elastomers and/or plasticizers for preventing the seepage of salt-contaminated water through the compositions; together with other additives such as xanthan gum and/or other gums for maintaining stability in salt-contaminated water; together with other components to manufacture a flexible grout composition for sealing drill holes contaminated with salt-contaminated water; for use as a water-swellable material in a layered water-sealing article of manufacture to prevent seepage of salt-contaminated water therethrough.

Examples of these technologies and uses for the water-swellable clays rewetted and redried in accordance with the present invention are disclosed in the following U.S. Patents, all of which are hereby incorporated by reference: Clem U.S. Pat. No. 3,186,896; Clem U.S. Pat. No. 4,048,373; Clem U.S. Pat. No. 4,021,402; Clem U.S. Pat. No. 4,084,382; Clem U.S. Pat. No. 4,087,365; Clem U.S. Pat. No. 4,279,547; McGroarty U.S. Pat. No. 4,316,833; Piepho U.S. Pat. No. 4,332,693; Harriett U.S. Pat. No. 4,534,925; Harriett U.S. Pat. No. 4,534,926; Alexander U.S. Pat. No. 4,634,538; Harriett U.S. Pat. No. 4,668,724; Harriett U.S. Pat. No. 4,696,698; Harriett U.S. Pat. No. 4,696,699; Alexander U.S. Pat. No. 4,886,550; Harriett U.S. Pat. No. 4,733,989; Alexander U.S. Pat. No. 4,832,793; Harriett U.S Pat. No. 4,810,573; and Alexander U.S. Pat. No. 4,847,226.

Excellent gel strength is achieved when industrially acceptable, water swellable, non-blue starting clays are processed in accordance with the present invention and then hydrated in salt-contaminated water. The water-swellable clays processed in accordance with the present invention are non-blue, e.g., are initially industrially acceptable for gel strength, having good water swellability and colloidal properties and having a sufficient ratio of $Fe^{+3}/Fe^{+2}$ above 1.0, preferably at least 3.0 and most preferably in the range of about 5.0 to about 15.0, and after processing by rewetting and redrying, the clays are excellent suspending agents for use in the cosmetics and pharmaceutical industries in amounts well know in the art.

SUMMARY OF THE INVENTION

In brief, the present invention is directed to a method of treating industrially acceptable, non-blue, water-swellable clays that are initially industrially acceptable having good water swellability and colloidal properties and having a sufficient ratio of $Fe^{+3}/Fe^{+2}$ above 1.0, preferably at least 3.0 and most preferably in the range of about 5.0 to about 15.0, and, after the clay has been mined and dried, rewetting and redrying the clay for unexpected improvement of clay properties. After the common initial drying of the clay to a moisture content of 12% or less, the clay is rewetted once to a moisture content of more than 12% by weight, preferably at least about 15% or more, based on the dry weight of the clay, then redried to a moisture content of 12% by weight or less, based on the dry weight of the clay. This rewetting and redrying processing of a dried (12% by weight water or less) non-blue, industrially acceptable clay having a $Fe^{+3}/Fe^{+2}$ ratio above 1.0 unexpectedly improves the salt-contaminated water absorbency and viscosity properties; unexpectedly increases the rheology properties of the clays for oil well drilling fluids, and lost circulation fluids when salt-contaminated water is encountered in the drill hole; and provides unexpectedly increased salt-contaminated water absorption in forming water-swellable clay-based water barriers, that impede the flow of salt-contaminated water.

Accordingly, one aspect of the present invention is to provide a new and improved method of beneficiating the chemical and/or physical properties of already industrially acceptable, non-blue, water-swellable clays, e.g., sodium bentonites that have good water swellability and good colloidal properties, and having a sufficient ratio of $Fe^{+3}/Fe^{+2}$, above 1.0, preferably at least 3.0 and most preferably in the range of about 5.0 to about 15.0, and, after processing, the rewetting and redrying improves the usefulness of the clay in one or more industries that water-swellable clays are used for their gel strength when in contact with salt-contaminated water; suspending properties when in contact with salt-contaminated water; salt-contaminated water-absorbing ability; or ability to increase the viscosity of salt-contaminated aqueous liquids.

Another aspect of the present invention is to provide a new and improved method of treating already industrially acceptable, non-blue, water-swellable clays, e.g., sodium bentonites, that have good water swellability and good colloidal properties, and have a sufficient ratio of $Fe^{+3}/Fe^{+2}$ above 1.0, preferably at least 3.0 and most preferably in the range of about 5.0 to about 15.0, by initially drying the clay to a moisture content of about 12% by weight or less, by rewetting the clay to a moisture content of more than 12% by weight, preferably at least about 15% by weight, and then redrying the clay to a moisture content of about 12% by weight or less, preferably prior to contacting the clay with salt-contaminated water.

Another aspect of the present invention is to provide a new and improved method of treating already industrially acceptable, non-blue, water-swellable clays, e.g., sodium bentonites, that have good water swellability and good colloidal properties, having a sufficient ratio of $Fe^{+3}/Fe^{+2}$, above 1.0, preferably at least 3.0 and most preferably in the range of about 5.0 to about 15.0, to maintain their effectiveness when in contact with salt-contaminated water including initially drying the clay to a moisture content of about 12% by weight or less; rewetting the clay to a moisture content of more than 12% by weight, preferably at least about 15% by weight; and then redrying the clay to a moisture content of about 12% by weight or less.

Another aspect of the present invention is to provide a new and improved method of treating already industrially acceptable, non-blue, water-swellable clays, e.g., sodium bentonites, that have good water swellability and good colloidal properties, having a sufficient ratio of $Fe^{+3}/Fe^{+2}$, above 1.0, preferably at least 3.0 and most preferably in the range of about 5.0 to about 15.0, that have been dried to a moisture content of about 12% by weight or less, to maintain their effectiveness when in contact with salt-contaminated water and, after the clay has been dried to a moisture content of about 12% by weight or less, the clay is processed by rewetting the clay to a moisture content of more than 12% by weight, preferably at least about 15% by weight, and then redrying the clay to a moisture content of about 12% by weight or less, to improve the gel strength of the clay when in contact with salt-contaminated water.

Still another aspect of the present invention is to provide a new and improved method of treating already industrially acceptable, non-blue, water-swellable clays, e.g., sodium bentonites, that have good water swellability and good colloidal properties, having a sufficient ratio of $Fe^{+3}/Fe^{+2}$, above 1.0, preferably at least 3.0 and most preferably in the range of about 5.0 to about 15.0, that have been dried to a moisture content of about 12% by weight or less, by rewetting the clay to a moisture content of more than 12% by weight, preferably at least about 15% by weight, and then redrying the clay to a moisture content of about 12% by weight or less, to improve the capacity of the clay to suspend and/or flocculate solids or immiscible liquids in dissolved salt-containing aqueous dispersions.

Another aspect of the present invention is to provide a new and improved method of treating already industrially acceptable, non-blue, water-swellable clays, e.g., sodium bentonites, that have good water swellability and good colloidal properties, having a sufficient ratio of $Fe^{+3}/Fe^{+2}$, above 1.0, preferably at least 3.0 and most preferably in the range of about 5.0 to about 15.0, that have been dried to a moisture content of about 12% by weight or less, to maintain the effectiveness of the water-swellable clay in salt-contaminated water, by rewetting the clay to a moisture content of more than 12% by weight, preferably at least about 15% by weight, and then redrying the clay to a moisture content of about 12% by weight or less, to improve the salt-contaminated water-absorbing capacity of the clay.

Another aspect of the present invention is to provide a new and improved method of treating already industrially acceptable, non-blue, water-swellable clays, e.g., sodium bentonites, that have good water swellability and good colloidal properties, having a sufficient ratio of $Fe^{+3}/Fe^{+2}$, above 1.0, preferably at least 3.0 and most preferably in the range of about 5.0 to about 15.0, by rewetting the clay to a moisture content of more than 12% by weight, preferably at least about 15% by weight, and then redrying the clay to a moisture content of about 12% by weight or less, to increase the capacity of the clay to increase the viscosity of dissolved salt-contaminated aqueous liquids.

Another aspect of the present invention is to provide a new and improved method of treating already industrially acceptable, non-blue, water-swellable clays, e.g., sodium bentonites, that have good water swellability and good colloidal properties, having a sufficient ratio of $Fe^{+3}/Fe^{+2}$, above 1.0, preferably at least 3.0 and most preferably in the range of about 5.0 to about 15.0, that have been dried to a moisture content of about 12% by weight or less, to maintain the effectiveness of the clay during drilling into an earthen formation containing salt-contaminated water, by rewetting the clay to a moisture content of more than 12% by weight, preferably at least about 15% by weight, and then redrying the clay to a moisture content of about 12% by weight or less, to increase the gel strength of an aqueous, salt-contaminated drilling mud containing the treated clay.

Still another aspect of the present invention is to provide a new and improved method of treating already industrially acceptable, non-blue, water-swellable clays, e.g., sodium bentonites, that have good water swellability and good colloidal properties, having a sufficient ratio of $Fe^{+3}/Fe^{+2}$, above 1.0, preferably at least 3.0 and most preferably in the range of about 5.0 to about 15.0, that have been dried to a moisture content of about 12% by weight or less, to maintain the effectiveness of the clay during drilling into an earthen formation containing salt-contaminated water, by rewetting the clay to a moisture content of more than 12% by weight, preferably at lest about 15% by weight, and then redrying the clay to a moisture content of about 12% by weight or less, to increase the capacity of the clay, in a salt. contaminated aqueous suspension, to plug cracks and interstices in a well to minimize loss of a drilling fluid.

The above and other aspects and advantages of the present invention will become more apparent when considered together with the following detailed description of the preferred embodiments, which is made with reference to the drawings, a brief description of which is provided below.

DETAILED DESCRIPTION OF THE PREFERRED EMBODIMENTS

Figure 1:
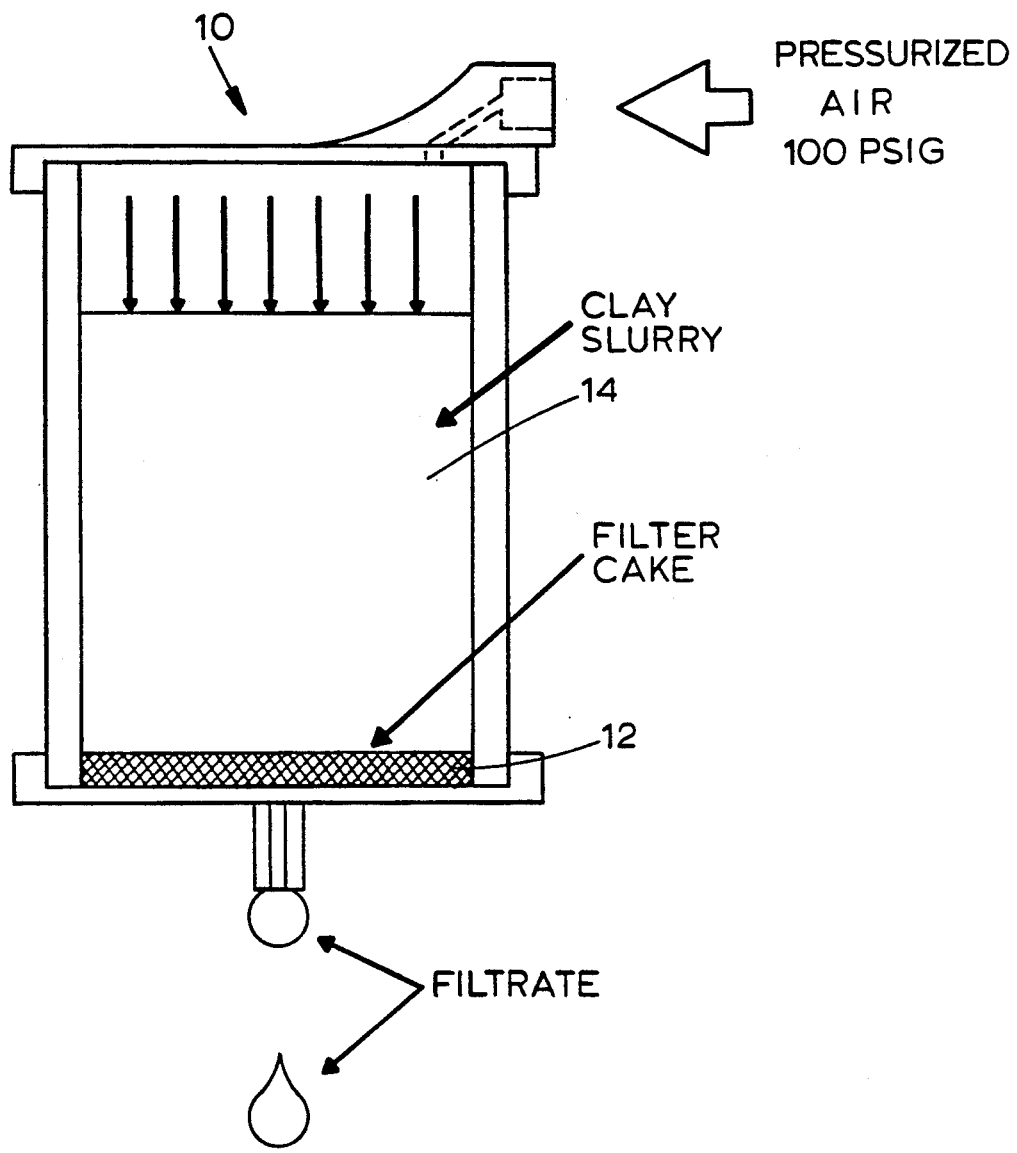
FIG. 1 is a schematic diagram of a top loading fluid loss cell used to measure the absorbency of the redried bentonite clay to absorb salt-contaminated water and for comparison testing of once dried bentonite clay.
Figure 2:
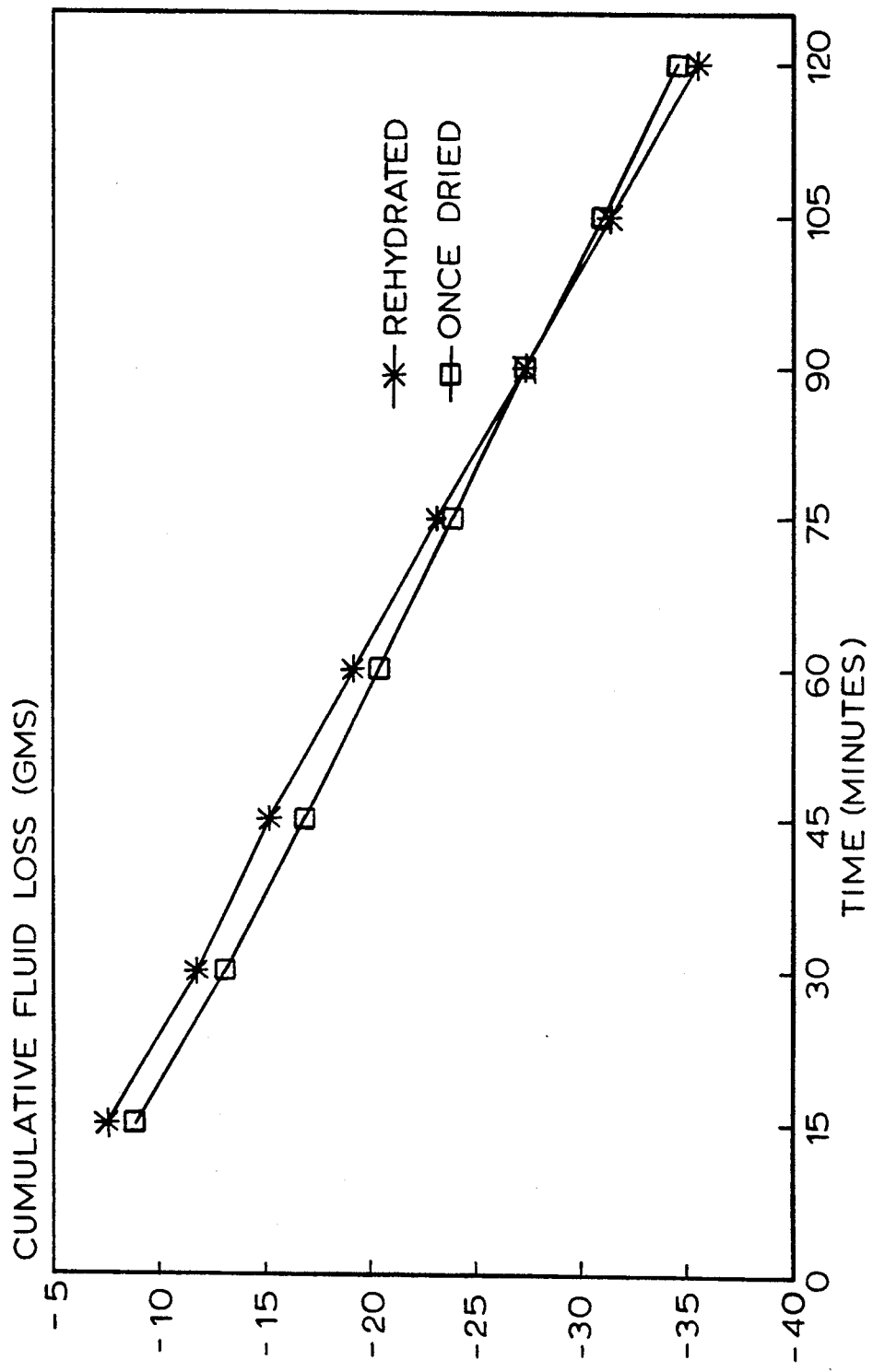
FIG. 2 is a graph showing fluid loss of rehydrated versus once dried crude bentonite using deionized water.

The present invention is directed to a method of treating already industrially acceptable, non-blue, water-swellable clays, e.g., sodium bentonites, that have good water swellability and good colloidal properties, having a sufficient ratio of $Fe^{+3}/Fe^{+2}$, above 1.0, preferably at least 3.0 and most preferably in the range of about 5.0 to about 15.0, to maintain their water-absorbing and water-swelling properties when in contact with salt-contaminated water. After the mined clay is initially dried to a moisture content of about 12% by weight or less, the clay is processed by rewetting and redrying the initially dried, industrially acceptable water-swellable colloidal clay, such as sodium bentonite and/or calcium bentonite, to very simply and unexpectedly maintain the water absorption and water-swellability of the clay when contacted with salt-contaminated water. The above-defined, non-blue, water-swellable clay starting materials, such as non-blue sodium bentonite, are obtained for use in the aforementioned industries by mining the clay, in a wet condition, generally having about 20% to about 25% by weight water, based on the dry weight of the clay, and then drying the clay to a suitable moisture content, e.g., 5–10% based on the dry weight of the clay so that the clay is suitable for grinding to a desired particle size distribution. Sometimes these clays are dried in the field to a desirable moisture content of about 10–15% water, based on the dry wight of the clay so that the industrial drying step is unnecessary prior to grinding.

Unexpectedly, and surprisingly, it has been found that if the above-defined, non-blue, water-swellable clay is mined and dried and the clay is rewetted to a moisture content of more than 12% by weight, preferably at least about 15% by weight water, based on the dry weight of the clay, and preferably to about 18% to about 25% water, based on the dry weight of the clay, and then redried down to a moisture content of about 12% by weight or less, preferably about 5% to about 8% or 10% water, based on the dry weight of the clay, the thus processed clay has improved properties of maintaining viscosity in salt-containing water; absorbency of salt-contaminated water; capacity to disperse solids and water-insoluble materials in salt-containing aqueous suspension; and capacity to flocculate suspended solids from salt-containing water.

The water-swellable colloidal clays that are useful as starting materials in accordance with the present invention are non-blue bentonites (green to greenish yellow to yellow to cream colored) that have industrially acceptable water swellability and colloidal properties, having a $Fe^{+3}/Fe^{+2}$ ratio greater than 1.0, and preferably at least 3.0 and most preferably in the range of about 5.0 to about 15.0. Such clays, including any non-blue, water-swellable colloidal clay which will hydrate in the presence of water, i.e., will swell in the presence of water, are substantially improved for use in contact with salt-containing water in accordance with the method of the present invention. In accordance with one important embodiment of the present invention, the colloidal clay is bentonite. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with this embodiment of the present invention may also contain other cations, such as magnesium and iron, so long as the $Fe^{+3}/Fe^{+2}$ ratio of the starting material (prior to rewetting and redrying) is at least 1.0, preferably at least 3.0 and most preferably in the range of about 5.0 to about 15.0.

There are cases wherein a montmorillonite predominant in calcium ions can be converted to a high swelling sodium variety through a well-known process called "peptizing". The colloidal clay starting material utilized in this invention may be one or more peptized bentonites so long as the $Fe^{+3}/Fe^{+2}$ ratio of the starting material (prior to rewetting and redrying) is at least 1.0, preferably at least 3.0 and most preferably in the range of about 5.0 to about 15.0. The non-blue colloidal clay starting material may also be any member of the dioctahedral or trioctahedral smectite group or mixtures thereof so long as the $Fe^{+3}/Fe^{+2}$ ratio of the starting material (prior to rewetting and redrying) is at least 1.0, preferably at least 3.0 and most preferably in the range of about 5.0 to about 15.0. Examples are Beidellite, Nontronite, Hectorite, Sepiolite and Samonite. To achieve the full advantage of the present invention, the colloidal clay, i.e., bentonite, generally is finely divided or ground as known for use in water barrier panels and the like, i.e., 4 to 350 mesh, preferably 20 to 50 mesh, either prior to rewetting, or after rewetting and drying the rewetted, initially non-blue clay.

The crude, mined, non-blue, industrially acceptable clay that already possesses sufficient water swellability and good colloidal properties and has a $Fe^{+3}/Fe^{+2}$ of at least 1.0, preferably at least 3.0 and most preferably in the range of about 5.0 to about 15.0, can be dried in any manner that is known in the art to achieve a clay in a condition capable of being ground to a desired particle size distribution. Grinding can be performed in accordance with the present invention prior to or after rewetting and redrying the clay, to achieve the same beneficial results.

In accordance with the principles of the present invention, the mined and dried industrially acceptable clay should be rewetted with non-salt-contaminated water to a water content of at least about 15% based on the dry weight of the clay and redried to a water content of about 12% or less, based on the dry weight of the clay, prior to or after grinding. The improvement in clay properties for use in contact with salt-contaminated water is achieved in accordance with the present invention regardless of the method used for wetting, drying, and grinding the clay so long as the dried water-swellable clay, having a moisture content of about 12% or less, is rewetted to a water content of more than 12% by weight, preferably at least about 15% by weight, based on the dry weight of the clay, and more preferably at least about 18% based on the dry weight of the clay, and thereafter redried to a water content of about 12% or less, based on the dry weight of the clay.

To illustrate the substantial and unexpected increase in the properties of a water-swellable clay, for absorption and swelling when in contact with salt-contaminated water, when rewetted and redried in accordance with the present invention, a crude sodium bentonite clay, having a $Fe^{+3}/Fe^{+2}$ ratio of at least 1.0, was obtained from Belle Fourche, S. Dak. Because this clay was received in its crudest form, it was dried once. Part of this "once dried" sample was rewetted to obtain approximately 25% moisture content. After allowing the rewetted clay to rehydrate for 24 hours, it was redried. A part of the once dried and a part of the rehydrated samples were separately treated with 10 ppt (pounds per ton) of SAPP (sodium acid pyrophosphate) and 10 ppt of CYPAN polymer. From this Belle Fourche base clay sample, four sub-samples were prepared. OD (once dried)—CRUDE, RH (rehydrated)—CRUDE, OD—TREATED, and RH—TREATED. All four samples were finely ground to pass a 0.5 mm grinder mesh screen. The two treated samples (OD and RH) were treated with the SAPP and the CYPAN prior to the fine grinding in order to produce more evenly mixed samples, as well as more uniform particle sizes.

To measure the effects of the rehydration process, comparative fluid loss tests were performed on the four samples using top loading cells 10, as shown in FIG. 1. The fluid loss test was chosen to produce the results that best relate to sealant properties. Clay suspensions or slurries were prepared at 6.25% solids and prehydrated for a minimum of 16 hours with various solutions. The aged slurries were remixed for 5 minutes prior to pouring into the top loading fluid loss cells 10. The air pressure was set at 100 psi (pounds per square inch) and the filtrates were weighed at 15 minute intervals. After the first 30 minutes, a "cake" 12 would form at the bottom of the cell. The remainder of the slurry 14 was poured out and then various testing solutions were poured into the cell on top of the existing cake. The air pressure was started again and the filtrates were weighed at 15 minute intervals until a total of 2 hours running pressure time was reached. Lower fluid loss values indicate that less fluid passed through the sample under the respective conditions. The various solutions used for the prehydration of the samples were DI (deionized) water, 500 ppm (parts per million) NaCl aqueous solution, and 1,000 ppm NaCl aqueous solution. The testing solutions were DI water and 1% NaCl aqueous solution.

Four main groups or series of fluid loss tests were performed:
(1) All four samples prehydrated with DI water/DI water as the testing solution
(2) All four samples prehydrated with DI water/1% NaCl solution as the testing solution
(3) All four samples prehydrated with 500 ppm NaCl solution/1% NaCl solution as the testing solution
(4) All four samples prehydrated with 1,000 ppm NaCl solution/1% NaCl solution as the testing solution The results of the four series of fluid loss tests are set forth in Table I:

TABLE I

FLUID LOSS (grams)
Prehydrated with DI Water/DI Water as Testing Solution

| Time Min. | OD CRUDE Inter | Cum | RH CRUDE Inter | Cum | OD TREAT Inter | Cum | RH TREAT Inter | Cum |
|---|---|---|---|---|---|---|---|---|
| 15 | 8.87 | 8.87 | 7.68 | 7.68 | 6.02 | 6.02 | 5.71 | 5.71 |
| 30 | 4.31 | 13.18 | 4.13 | 11.81 | 3.18 | 9.20 | 3.00 | 8.71 |
| 45 | 3.72 | 16.90 | 3.41 | 15.22 | 3.45 | 12.65 | 2.75 | 11.46 |
| 60 | 3.52 | 20.42 | 3.99 | 19.21 | 3.18 | 15.83 | 2.70 | 14.16 |
| 75 | 3.50 | 23.92 | 4.06 | 23.27 | 3.01 | 18.84 | 2.71 | 16.87 |
| 90 | 3.57 | 27.49 | 4.09 | 27.36 | 3.01 | 21.85 | 2.71 | 19.58 |
| 105 | 3.56 | 31.05 | 4.09 | 31.45 | 2.94 | 24.79 | 2.71 | 22.29 |
| 120 | 3.57 | 34.62 | 4.07 | 35.52 | 2.94 | 27.73 | 2.70 | 24.99 |

Figure 3:
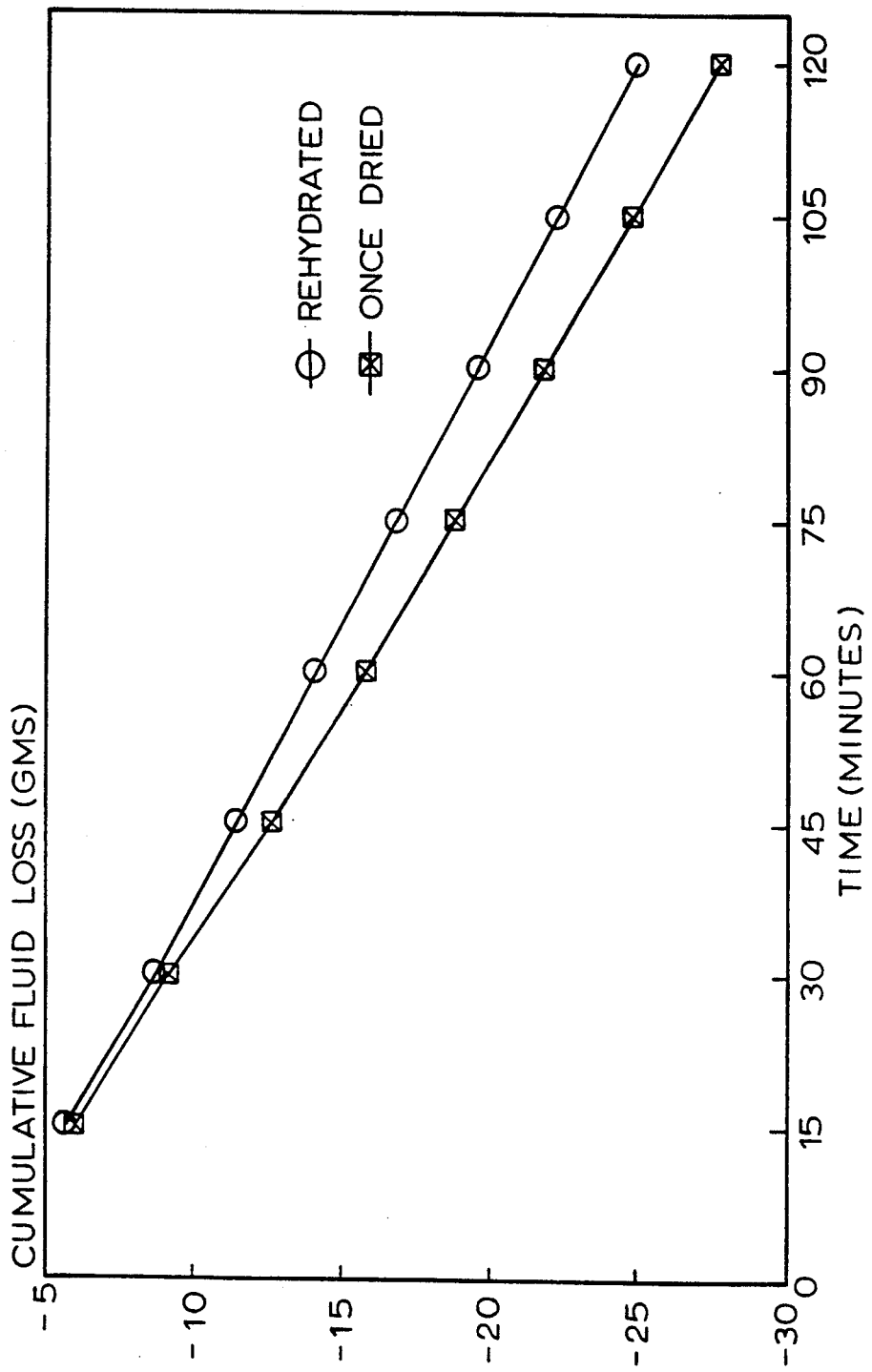
FIG. 3 is a graph showing fluid loss of rehydrated versus once dried treated bentonite using deionized water.

By Table I and FIG. 3, the cumulative fluid loss of the RH TREATED sample was lower than the OD TREATED. This indicates that with the least contaminated solutions (DI water), the presence of the chemical treat additives did not appear to interfere with the improving effects of the rehydration process.

Likewise, the RH TREATED cumulative fluid loss values were lower than the RH CRUDE which indicates that the rehydration process does not appear to hinder the intended effects of the chemical additives, as shown in Table II:

TABLE II

FLUID LOSS (grams)
Prehydrated with DI Water/1% NaCl as Testing Solution

| Time Min. | OD CRUDE Inter | Cum | RH CRUDE Inter | Cum | OD TREAT Inter | Cum | RH TREAT Inter | Cum |
|---|---|---|---|---|---|---|---|---|
| 15 | 9.04 | 9.04 | 7.68 | 7.68 | 6.15 | 6.15 | 6.35 | 6.35 |
| 30 | 4.34 | 13.38 | 4.05 | 11.73 | 3.23 | 9.38 | 3.20 | 9.55 |
| 45 | 3.37 | 16.75 | 3.47 | 15.20 | 2.48 | 11.86 | 2.33 | 11.88 |
| 60 | 3.12 | 19.87 | 2.96 | 18.16 | 2.54 | 14.40 | 2.14 | 14.02 |
| 75 | 3.01 | 22.88 | 2.95 | 21.11 | 2.48 | 16.88 | 2.14 | 16.16 |
| 90 | 2.99 | 25.87 | 2.90 | 24.01 | 2.43 | 19.31 | 2.09 | 18.25 |
| 105 | 2.96 | 28.83 | 2.84 | 26.85 | 2.37 | 21.68 | 2.06 | 20.31 |
| 120 | 2.89 | 31.72 | 2.79 | 29.64 | 2.33 | 24.01 | 2.06 | 22.37 |

Figure 4:
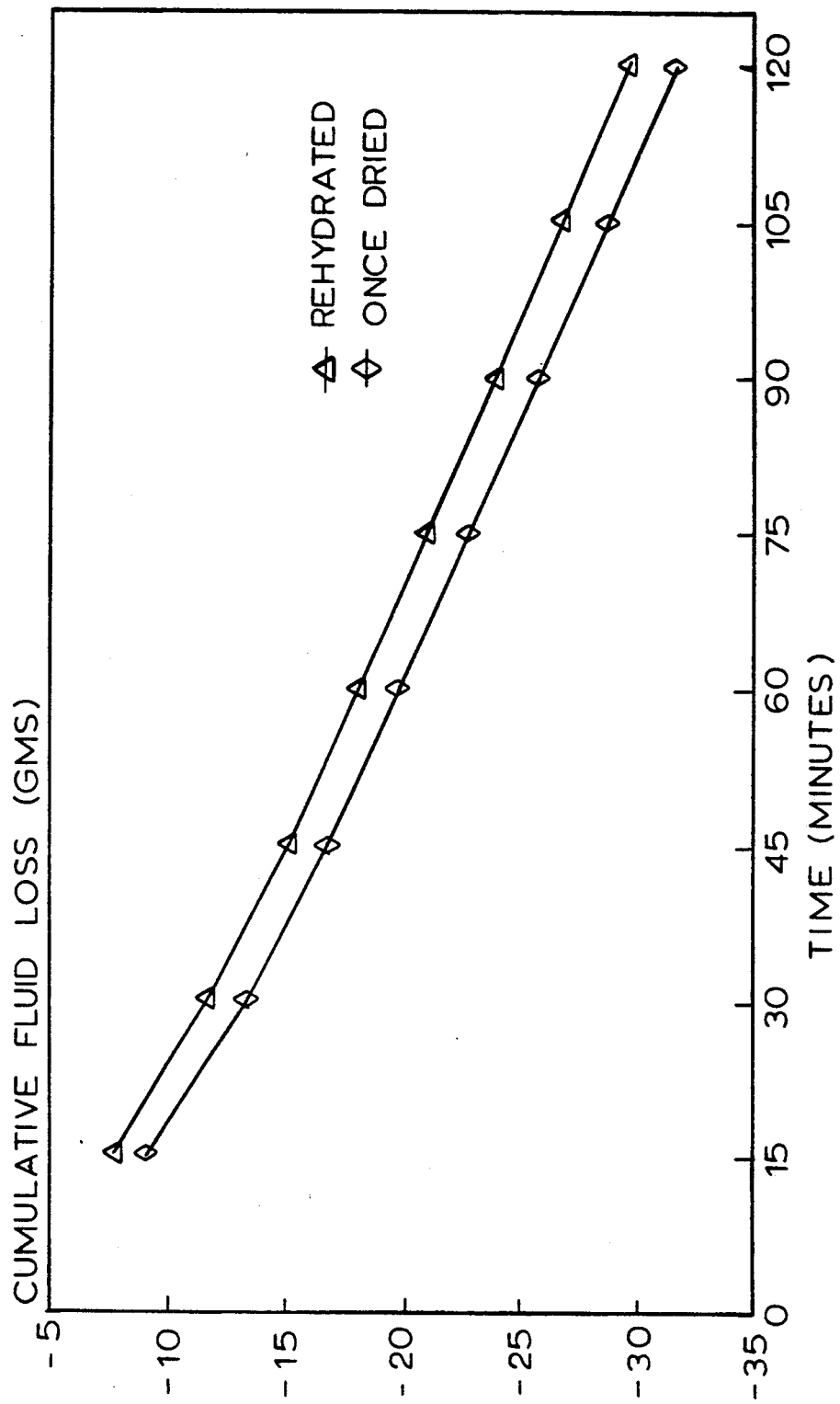
FIG. 4 is a graph showing resistance of rehydrated versus once dried crude bentonite to fluid loss using 1% NaCl after 30 minutes of deionized water pretreatment.
Figure 5:
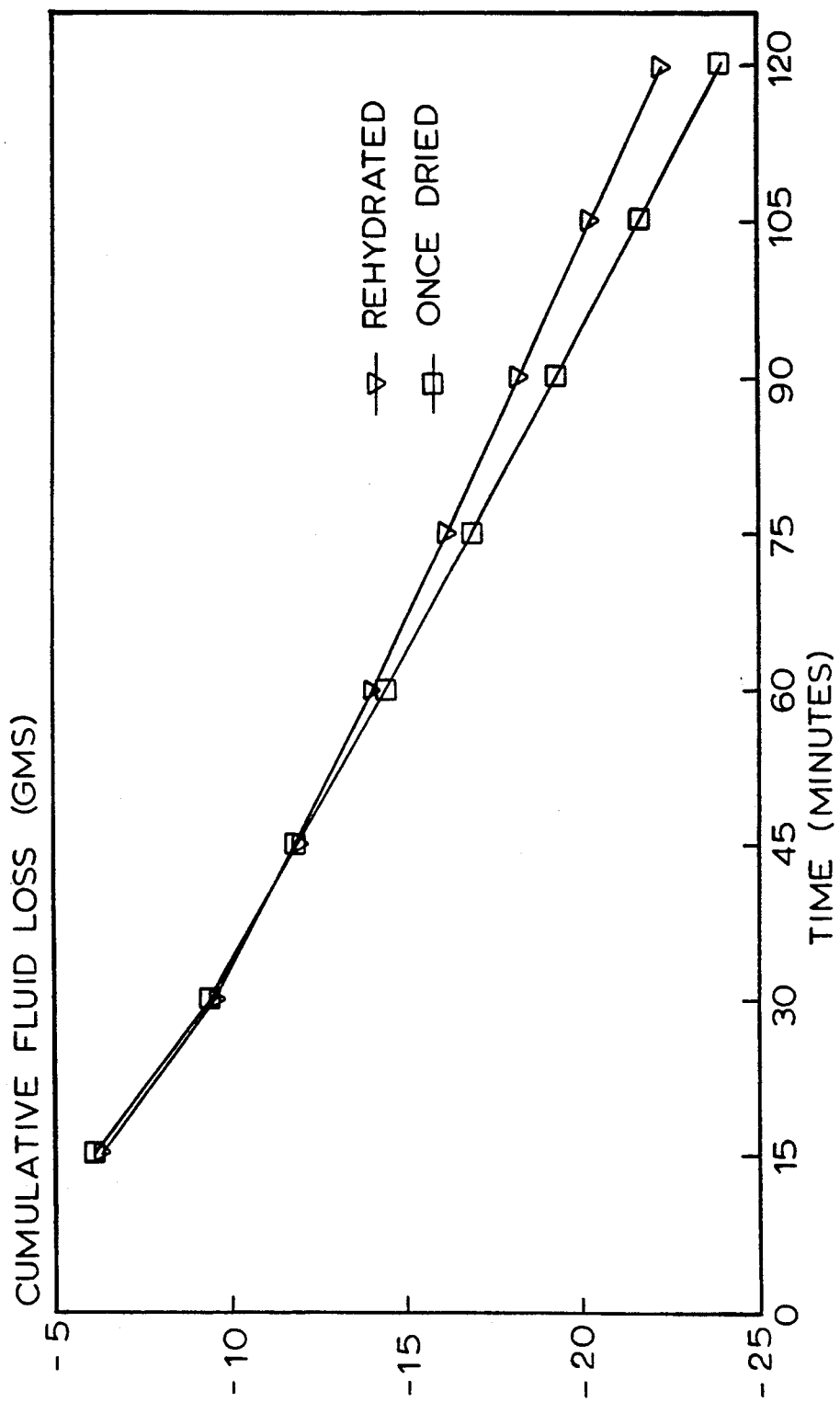
FIG. 5 is a graph showing resistance of rehydrated versus once dried treated bentonite to fluid loss using 1% NaCl after 30 minutes of deionized water pretreatment.
Figure 6:
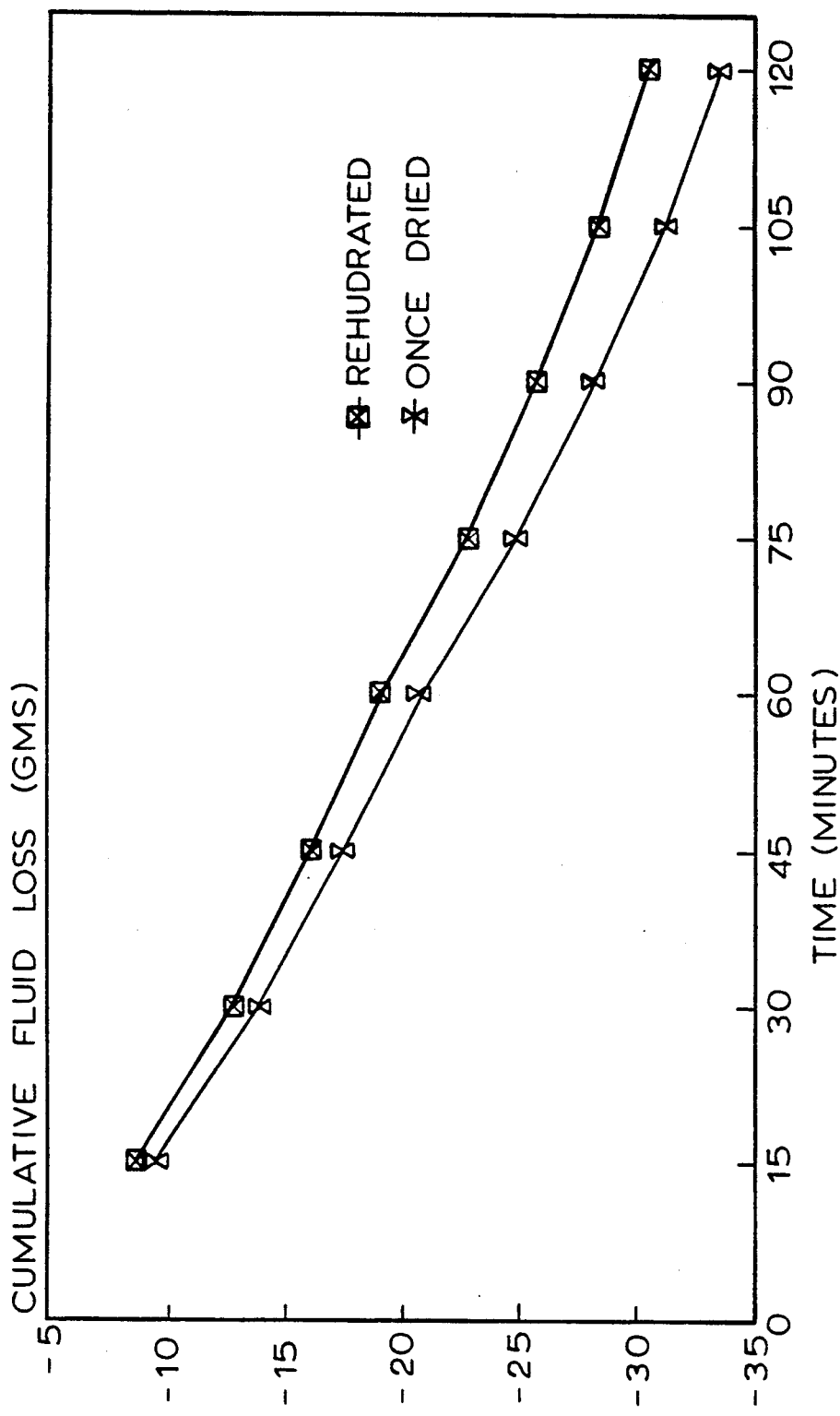
FIG. 6 is a graph showing resistance of rehydrated versus once dried crude bentonite to fluid loss using 1% NaCl after 500 ppm brine soak.
Figure 7:
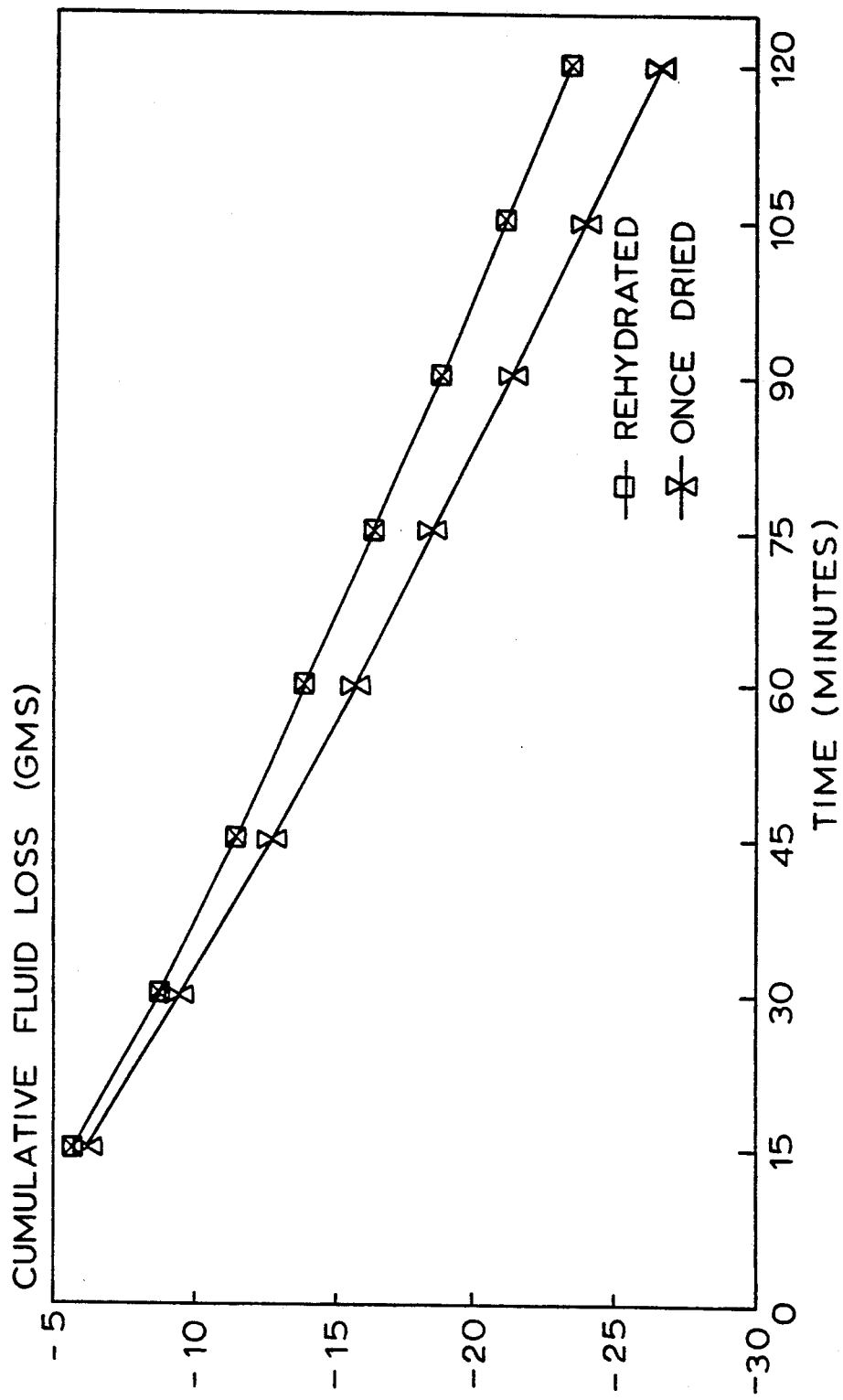
FIG. 7 is a graph showing resistance of rehydrated versus once dried treated bentonite to fluid loss using 1% NaCl after 500 ppm brine soak.
Figure 8:
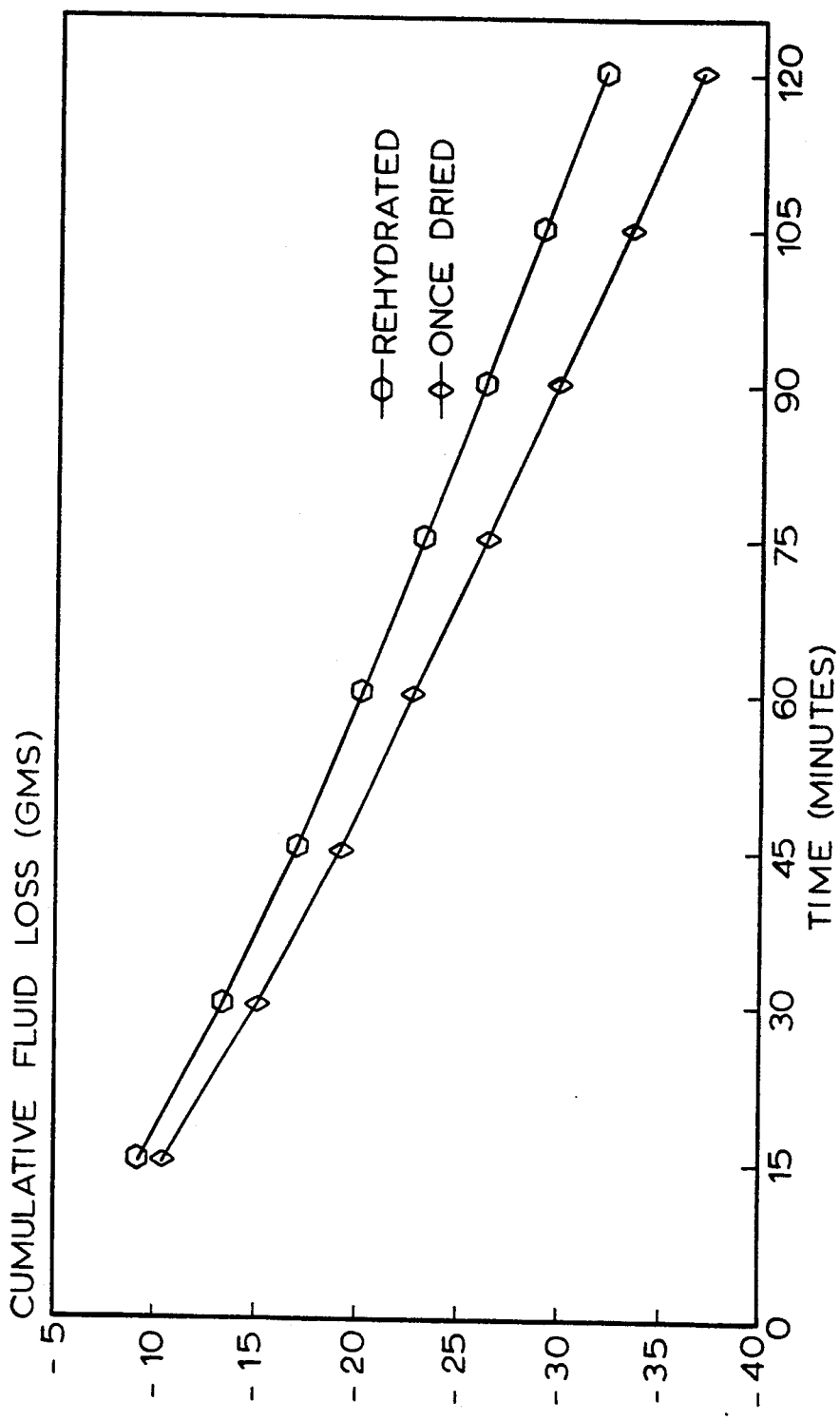
FIG. 8 is a graph showing resistance of rehydrated versus once dried crude bentonite to fluid loss using 1% NaCl after 1,000 ppm brine soak.
Figure 9:
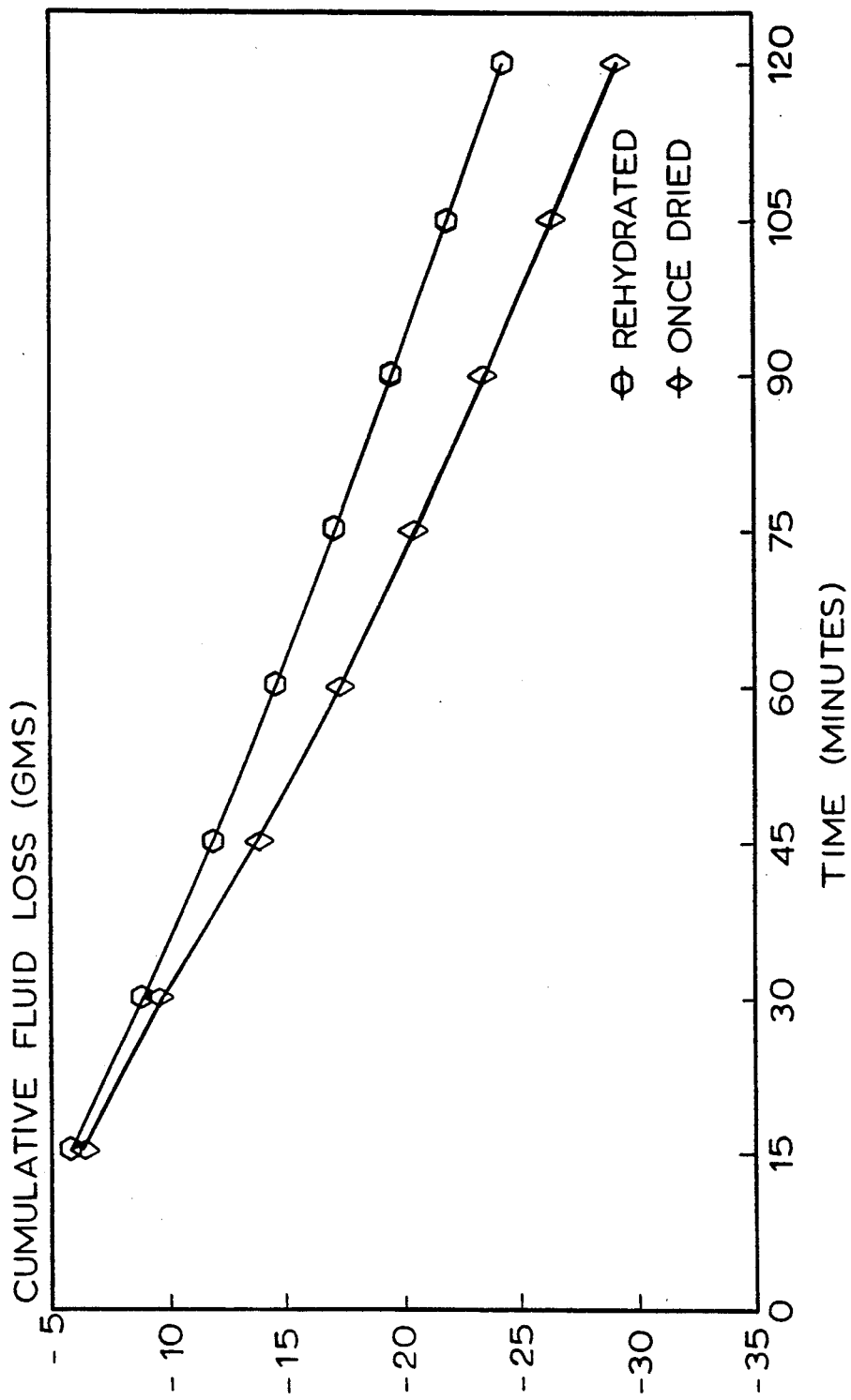
FIG. 9 is a graph showing resistance of rehydrated versus once dried treated bentonite to fluid loss using 1% NaCl after 1,000 ppm brine soak.

Table II and FIGS. 4 and 5 show that whether the samples were crude or treated, the rehydrated samples had the lower total cumulative fluid loss values. This suggests that both of the rehydrated samples allowed less of the saline testing solution to pass through while both of the once dried samples allowed more.

Tables III and IV and FIGS. 6, 7, 8 and 9 indicate that even when the samples were prehydrated with saline contaminated water, the rehydrated samples (both crude and treated) were able to prevent more NaCl testing solution from passing through the once dried samples.

TABLE III

FLUID LOSS (grams)
Prehydrated with 500 ppm NaCl Solution/1% NaCl Testing Solution

| Time Min. | OD CRUDE Inter | Cum | RH CRUDE Inter | Cum | OD TREAT Inter | Cum | RH TREAT Inter | Cum |
|---|---|---|---|---|---|---|---|---|
| 15 | 9.50 | 9.50 | 8.72 | 8.72 | 6.14 | 6.14 | 5.70 | 5.70 |
| 30 | 4.48 | 13.98 | 4.19 | 12.91 | 3.28 | 9.42 | 3.11 | 8.81 |
| 45 | 3.54 | 17.52 | 3.27 | 16.81 | 3.39 | 12.81 | 2.64 | 11.45 |
| 60 | 3.23 | 20.75 | 2.88 | 19.06 | 2.94 | 15.75 | 2.52 | 13.97 |
| 75 | 4.22 | 24.97 | 3.82 | 22.88 | 2.81 | 18.56 | 2.42 | 16.39 |
| 90 | 3.20 | 28.17 | 2.91 | 25.79 | 2.76 | 21.32 | 2.38 | 18.77 |
| 105 | 3.14 | 31.31 | 2.73 | 28.52 | 2.66 | 23.98 | 2.32 | 21.09 |
| 120 | 2.23 | 33.54 | 2.01 | 30.53 | 2.55 | 26.53 | 2.29 | 23.38 |

TABLE IV

FLUID LOSS (grams)
Prehydrated with 1,000 ppm NaCl Solution/1% NaCl Testing Solution

| Time Min. | OD CRUDE Inter | Cum | RH CRUDE Inter | Cum | OD TREAT Inter | Cum | RH TREAT Inter | Cum |
|---|---|---|---|---|---|---|---|---|
| 15 | 10.35 | 10.35 | 9.17 | 9.17 | 6.30 | 6.30 | 5.77 | 5.77 |
| 30 | 4.78 | 15.13 | 4.35 | 13.52 | 3.27 | 9.57 | 3.14 | 8.91 |
| 45 | 4.07 | 19.20 | 3.60 | 17.12 | 4.33 | 13.90 | 2.99 | 11.90 |
| 60 | 3.63 | 22.83 | 3.14 | 20.26 | 3.50 | 17.40 | 2.75 | 14.65 |
| 75 | 3.55 | 26.38 | 3.02 | 23.28 | 3.12 | 20.52 | 2.51 | 17.16 |
| 90 | 3.47 | 29.85 | 2.99 | 26.27 | 2.98 | 23.50 | 2.44 | 19.60 |
| 105 | 3.59 | 33.44 | 2.91 | 29.18 | 2.90 | 26.40 | 2.40 | 22.00 |
| 120 | 3.47 | 36.91 | 2.92 | 32.10 | 2.78 | 29.18 | 2.36 | 24.36 |

Comparative fluid loss testing indicates that the rehydration process can be used with non-blue bentonite clays without apparent interference to the rehydration enhancing effects. Likewise, the rehydration process did not appear to impede the effects of chemical additives. When certain saline-contaminated solutions were introduced, the rehydrated samples produced lower cumulative fluid loss values than the once dried samples. The testing also suggests that the rehydrated samples, when prehydrated with a contaminated saline solution, still produced more favorably lower cumulative fluid loss values than the once dried samples.

It should be understood that the present disclosure has been made only by way of preferred embodiments and that numerous changes in details of construction, combination and arrangement of parts can be resorted to without departing from the spirit and scope of the invention as hereunder claimed.

What is claimed and sought to be secured by Letters Patent of the United States is what is claimed is:

1. A method of absorbing salt-contaminated water with a treated, water-swellable clay, by treating the water-swellable clay that has been recovered and dried to a moisture content of 12% or less, based on the dry weight of the clay to improve its ability to absorb and swell when in contact with salt-containing water comprising:

rewetting the clay to a moisture content of more than 12% by weight based on the dry weight of the clay;

drying the rewetted clay to a moisture content of 12% by weight or less, based on the dry weight of the clay; and contacting the treated clay with salt-contaminated water to swell the treated clay.

2. The method of claim 1 further including grinding the clay prior to rewetting the clay.

3. The method of claim 1 further including grinding the clay after drying the rewetted clay.

4. The method of claim 1, wherein the water-swellable clay is rewetted to a moisture content of about 18% to about 25% by weight based on the dry weight of the clay, prior to redrying.

5. The method of claim 1, wherein the water-swellable clay is rewetted to a moisture content of at least about 20% by weight, based on the dry weight of the clay, prior to redrying.

6. The method of claim 1, wherein the water-swellable clay is selected from the group consisting of montmorillonite, beidellite, nontronite, hectorite, sepiolite and samonite, and initially has a $Fe^{+3}/Fe^{+2}$ ratio of at least 1.0.

7. The method of claim 1, wherein the water-swellable clay is a montmorillonite clay.

8. The method of claim 7, wherein the water-swellable clay is bentonite.

9. The method of claim 7, wherein the water-swellable clay is bentonite having sodium as its principle exchangeable cation.

10. The method of claim 2, wherein the clay is ground so that 100% of the clay passes through a 0.5 mm screen.

11. The method of claim 3, wherein the clay is ground so that 100% of the clay passes through a 0.5 mm screen.

12. In a method of drilling a borehole into an earthen formation that contains salt-contaminated water, by circulating an aqueous water-swellable clay-based drilling fluid in an area between a drill pipe and the borehole, said aqueous clay-based drilling fluid composition including water and a water-swellable clay in an amount of about 2 to about 20 pounds of water-swellable clay per barrel of drilling fluid, the improvement comprising, the water-swellable clay in the drilling fluid having improved rheological properties wherein contact with salt-contaminated water by treating the clay, after recovery and drying to a moisture content of about 12% by weight or less, based on the dry weight of the clay, by rewetting the clay to a moisture content of more than 12% by weight, based on the dry weight of the clay, and redrying the clay to a moisture content of 12% by weight or less, based on the dry weight of the clay, wherein the treated clay absorbs said salt-contaminated water from said borehole.

13. In a method of drilling a well employing a cutting bit and an aqueous water-swellable clay-based drilling fluid, said drilling fluid being circulated in said well during drilling, the improvement comprising said drilling fluid including a water-swellable clay having improved rheological properties upon contact with salt-contaminated water by treating the clay after recovery and drying to a moisture content of 12% by weight or less, based on the dry weight of the clay, by rewetting the clay to a moisture content of more than 12% by weight, based on the dry weight of the clay, and redrying the clay to a moisture content of about 12% by weight or less, based on the dry weight of the clay.

14. In a composition including a solid, particulate material suspended in an solubilized salt-containing aqueous carrier with a water swellable clay suspending agent in an amount sufficient to achieve a stable suspension, the improvement comprising the water-swellable clay having improved suspending properties in the salt-containing water by treating the clay, after recovery and drying to a moisture content of 12% by weight or less, based on the dry weight of the clay, by rewetting the clay to a moisture content of more than 12% by weight, based on the dry wight of the clay, and redrying the clay to a moisture content of 12% by weight or less, based on the dry weight of the clay.

15. In a method of suspending a solid, particulate material in a dissolved salt-containing aqueous carrier with a water-swellable clay suspending agent, the improvement comprising the water-swellable clay having improved suspending properties wherein contact with the salt-containing water by treating the clay, after recovery and drying to a moisture content of 12% by weight or less, based on the dry weight of the clay, by rewetting the clay to a moisture content of more than 12% by weight, based on the dry weight of the clay, and redrying the clay to a moisture content of 12% by weight or less, based on the dry weight of the clay.

* * * * *